United States Patent [19]

Schultz

[11] Patent Number: 4,586,459
[45] Date of Patent: May 6, 1986

[54] LIQUID CHEMICAL APPLICATOR

[75] Inventor: George Schultz, Champion, Canada

[73] Assignee: Gean Agricultural Manufacturing Ltd., Alberta, Canada

[21] Appl. No.: 683,754

[22] Filed: Dec. 19, 1984

[30] Foreign Application Priority Data

Dec. 4, 1984 [CA] Canada .................................. 451825

[51] Int. Cl.⁴ ........................ B05B 15/06; B05B 15/00
[52] U.S. Cl. .................................... 118/303; 118/417
[58] Field of Search ................................ 118/303, 417

[56] References Cited

U.S. PATENT DOCUMENTS

| 3,773,220 | 11/1973 | Morgan et al. | 222/48 |
| 3,841,263 | 10/1974 | Rohloff | 118/303 |
| 3,961,730 | 6/1976 | Haynes | 222/231 |
| 3,968,771 | 7/1976 | Walgenbach | 118/303 |
| 4,023,525 | 5/1977 | Weber | 118/303 |
| 4,079,696 | 3/1978 | Weber | 118/417 |
| 4,167,896 | 9/1979 | Clements | 118/303 |
| 4,503,803 | 3/1985 | Barnes | 118/303 |

FOREIGN PATENT DOCUMENTS

| 79602 | 1/1903 | Canada . |
| 176565 | 4/1917 | Canada . |
| 968770 | 6/1975 | Canada . |
| 970743 | 7/1975 | Canada . |
| 1048003 | 2/1979 | Canada . |
| 1072513 | 2/1980 | Canada . |
| 1075657 | 4/1980 | Canada . |

Primary Examiner—Shrive P. Beck
Attorney, Agent, or Firm—Jim Zegeer

[57] ABSTRACT

A device for attachment to a conveyor of the auger type for supplying a liquid additive to a particulate material, such as seed grain, being transferred through the conveyor. The device includes a bracket for rigid connection to an outer casing of the conveyor, the bracket including upstanding arms between which is mounted a container for holding a supply of the additive. An additional member is clamped to the conveyor and provides an inlet to the interior of the casing, and a conduit connects an outlet of the container to the inlet member. A pivotal mounting between the container and the arms of the bracket allows the container to be moved to an upright position regardless of the angle of the conveyor.

19 Claims, 7 Drawing Figures

LIQUID CHEMICAL APPLICATOR

BACKGROUND OF THE INVENTION

1. Field of the Invention

This invention relates to a liquid applicator, and more particularly to a device for attachment to a conveyor of the type which includes an auger rotatably mounted within an outer casing, the device being adapted to supply a liquid additive to a particulate material being transferred through the conveyor.

It is customary to treat seed before planting for protection against disease and insects. Seed which has already been treated can be purchased, but when planting large quantities of seed, such as cereal grains, it is common for the farmer to treat his own seed grain. This can be done in the area of the storage of the seed grain, but in order to reduce the amount of handling of the grain, it is preferable to treat the seed as it is being loaded into the seed drill. The treatment of the seed when loading the seed drill has the additional advantages of the treatment being fresh when the seed is planted, and of more importance, with this approach, the seed which is coated with the toxic chemical additive is not handled to any extent by the operator and does not come into contact with other equipment such as grain bins, trucks etc.

2. Prior Art

Numerous elaborate mechanisms have been developed for treating seed grain, but it has been found that an experienced operator can apply liquid chemical to seed grain in the field well within tolerable limits with relatively simple equipment if appropriate care is taken.

SUMMARY OF THE INVENTION

It is an object of the present invention to provide an economical device which allows convenient and safe handling of a chemical additive, such as a seed treatment additive, while applying the additive to seed being transferred by a commonly used grain auger conveyor.

According to the present invention there is provided a device including a bracket member for rigid attachment to an outer casing of the conveyor and a container for holding a supply of a liquid additive, the container having an outlet means. A pivoted connection means is provided for mounting the container on the bracket for permitting adjustment of the container relative to the bracket so as to be able to maintain the container upright regardless of the inclination of the conveyor. An inlet means is adapted to be rigidly affixed to the casing of the conveyor and it includes means for communicating with the interior of the casing. A conduit means connects the outlet means of the container with the inlet means for permitting flow of the additive from the container to the interior of the conveyor.

In a specific embodiment of the invention the bracket includes a pair of upwardly projecting arms with outer extremities spaced to receive the container therebetween. The pivotal connecting means includes means mounted on side walls of the container for interconnection with means carried on the outer extremities of the arms. The pivotal connecting means may include an arrangement whereby the container can be readily removed from the bracket.

DESCRIPTION OF THE DRAWINGS

In the accompanying drawings, which illustrate one embodiment of the invention, by way of an example.

DESCRIPTION OF PREFERRED EMBODIMENTS

Figure 1:
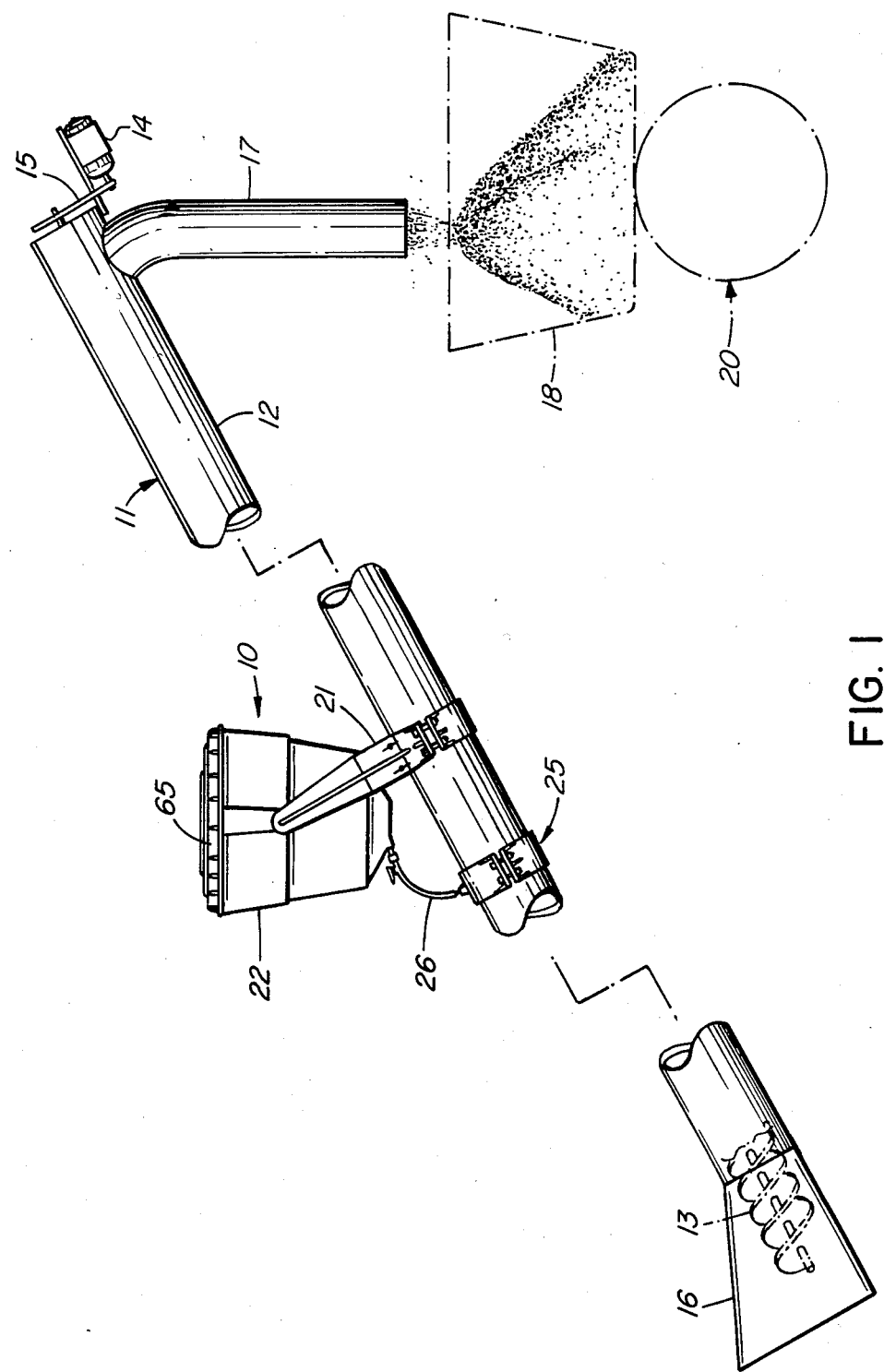
FIG. 1 is a side view of a conveyor on which has been mounted the device of the present invention.

In FIG. 1, the reference character 10 generally denotes the applicator of the present invention which is attached to a conveyor 11 of the type having a cylindrical outer casing 12 with an auger 13 rotatably mounted therein. An electric or hydraulic motor 14 is mounted on the outer end of the conveyor and includes drive means 15 for turning the auger 13. A hopper 16 is provided at the lower end of the conveyor and into which seed to be treated can be poured from a grain box, dump truck or other bulk carrier loaded with the seed. Rotation of the auger 13 transfers the grain to the upper end of the conveyor from which it spills through an outlet spout 17. The spout 17 may be positioned over the box 18 of a seed drill 20 so that after the box has been filled with treated seed, the seed can be sown directly into the ground from the seed drill 20.

The applicator includes a bracket 21 which may be rigidly attached to the outer casing 12 and carries a container 22 for holding a supply of the chemical additive used for treating seed. The container 22 is mounted for pivotal movement about a horizontal axis 23 (FIG. 3) between arms 24,24 of bracket 21. An inlet means 25 is also rigidly attached to the outer casing 12 at a short distance from the bracket 21, and a conduit means 26 extends between the container 22 and the inlet means 25 for permitting flow of the additive from the container to the interior of the casing 12 of the conveyor 11.

The bracket 21 may be formed from three parts molded from a durable non-brittle plastic material, such as nylon. Two of the parts 27,27 may be of identical form, i.e. each can be formed in the same mold, and when secured together by fasteners 30, which may be a pair of nuts and bolts, form a base portion 31 having a downwardly open semi-cylindrical inner surface 32 of the approximate diameter of the outer casing. The third part is a bottom member 34 also having a semi-cylindrical inner surface 33 which cooperates with the base portion 31 to provide a clamp means for rigidly fixing the bracket to the conveyor. Both the base portion 31 and bottom member 34 have outwardly projecting flanges 35 with aligned apertures for a securing fastener 36 which may be two pairs of nuts and bolts. Each arm 24 is formed integrally with its associated half of the base portion 31, and includes an inner portion 40, an intermediate portion 41 and an outer extremity or outer portion 42. In cross section intermediate the outer portions 41 and 42 of each arm is approximately T-shaped, formed by an outer central web 43 and a flange 44. In the inner portion 40, there is an inner central web 45 as well for increased strength. When the two parts 27,27 are fastened together, the inner portions 40 of the two arms diverge sharply from each other, and the intermediate portions 41 diverge less sharply. The outer portions 42, which are substantially parallel to each other, are thus spaced a distance sufficient to secure the container 22 therebetween.

The outer end portions 42 of the arms 24,24 define opposed flat inner surfaces 46, and formed integrally with the arms and projecting inwardly from the inner surfaces 46 are opposed stub shafts 47 each having a cylindrical portion 50 and an enlarged head 51. The cylindrical portion 50 of the opposed stub shafts 47 have a central axis on the line forming the axis 23 of pivot of the container. The central plane of the bracket extending through the axis of the stub shafts is normal to the central longitudinal axis of the conveyor 11 when mounted thereon.

By making the bracket 21 from two identical parts 27,27 which are bolted together, the cost of molding is reduced, and by placing shims at the line of joinder before tightening the nuts of the fasteners 36 the bracket can be adapted for use with a conveyor 11 having a larger external diameter.

Figure 3:
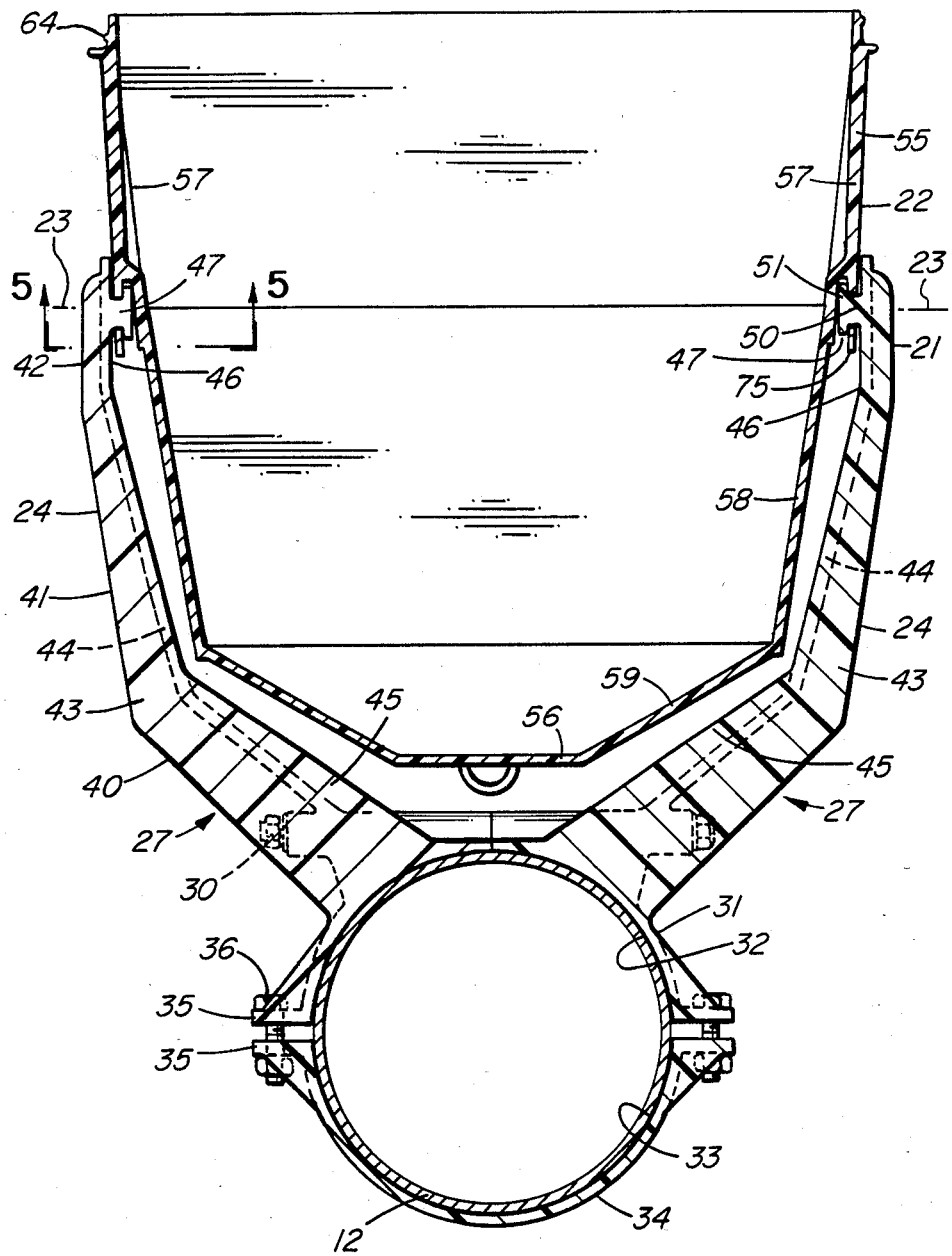
FIG. 3 is an enlarged sectional view as seen from the line 3—3 of FIG. 2 but with the lid removed.

The container 22 is preferably formed of a transparent or semi-transparent plastic such as polypropylene, and is in the form of an open-topped container having a bottom 56 and a side wall 55, which is circular in cross-section. The side wall is formed by a plurality of integral tiered sections 57, 58 and 59 each tapering downwardly and inwardly with each tier having a greater taper than the one above so that the container is of progressively smaller diameter towards the bottom. As shown in FIG. 3, the tiers 58 and 59 correspond substantially in taper to the angle of the intermediate and inner portions 41 and 40 of the arms so that the container occupies substantially all of the space between the diverging arms 24,24.

Figure 2:
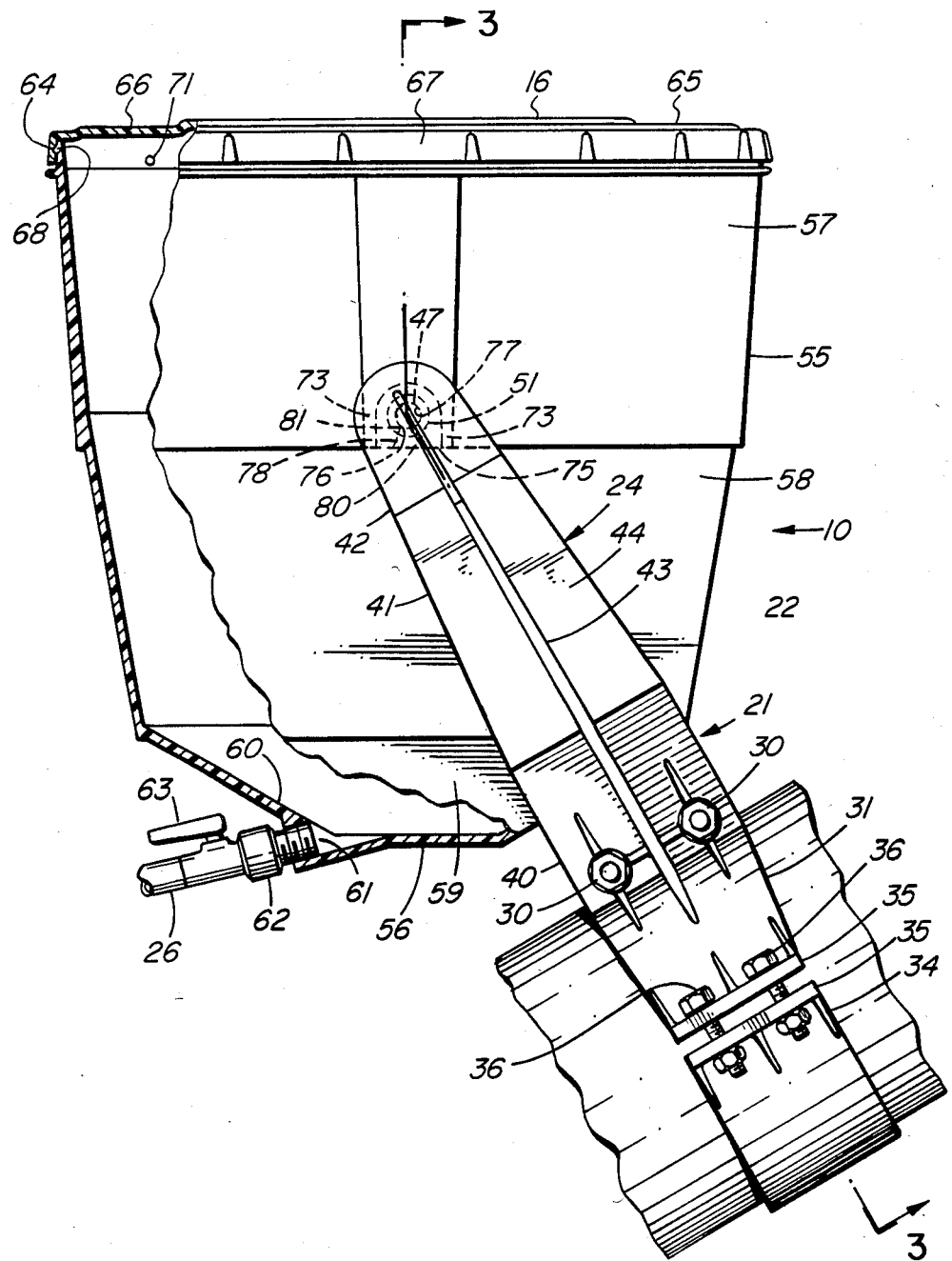
FIG. 2 is an enlarged side view of the bracket and container of the device of FIG. 1 and showing both the container and bracket in partial section for sake of clarity.

An outlet 60 in the form of a thread opening 61 is inclined downwardly from the bottom 56 (FIG. 2). The outlet 60 receives a valve 62 which in one position closes flow from the outlet 60. The valve is of a type which can be moved through a series of positions to control the rate of flow of an additive from the container 22. If desired calibrated markings may be associated with the manually adjustable handle 63 of the valve so as to provide an indication of the rate of flow.

The side wall has an external thread 64 at the very top of the upper tier 57, and a lid 65 which consists of a circular central portion 66 and a downwardly depending peripheral skirt 67 is adapted to fit over the side wall to close the open top. The skirt 67 of the lid has internal threads 68 for engaging threads 64 so that the lid may be turned into a locked position. A vent hole 71 is provided in the side wall immediately below the thread 64 but in a position to be covered by the lower portion of the skirt 67.

Figure 5:
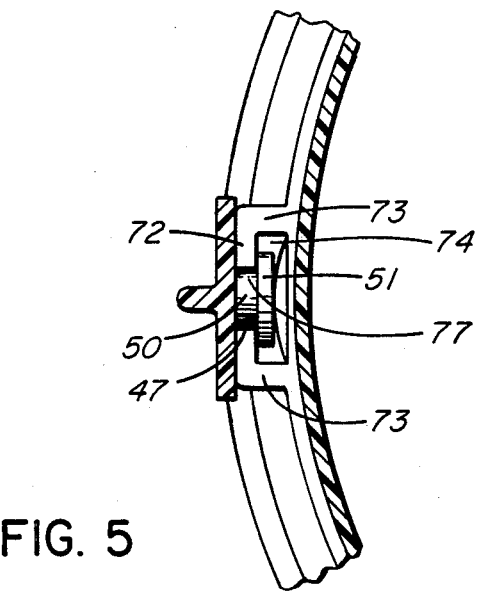
FIG. 5 is an enlarged sectional view of the pivot connection between the container and one arm of the bracket as seen from the line 5—5 of FIG. 3.
Figure 6:
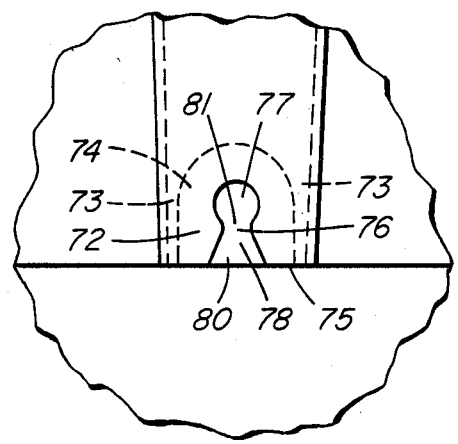
FIG. 6 is a side view of a portion of the side of the container illustrating means for connecting the container to the bracket.

On diametrical opposed sides of the upper tier 51 a vertical web 72 is provided, the web 72 being connected to the container along side edges thereof by flanges 73, 73 (FIG. 5). Because the web 72 is vertical and the upper tier is tapered inwardly a wedge-shaped space 74 is provided between the web and the outer surface of the side wall. The web 72 is of a thickness slightly less than the length of the cylindrical portion 50 of the stub shaft. A lower edge 75 of the web 72 is even with the lower edge of the upper tier 57. The wedge-shaped space 74 has a width between flanges 73,73 sufficient to receive the enlarged head 51 of the stub shaft 47. Web 72 defines an opening 76 of key hole shape including a circular aperture portion 77 dimensioned to tightly receive the cylindrical portion 50 of the stub shaft. The opening 76 includes a slot 78 extending from lower edge 75 of the web to the circular aperture portion 77. The slot includes a wider lower end portion 80 and a restricted upper end portion 81 at the aperture portion 77 so that as the cylindrical portion 50 of the stub shaft is forced side-ways into the slot there is some distortion of the web sufficient to let the stub shaft pass with resistance into the aperture portion 77.

Figure 4:
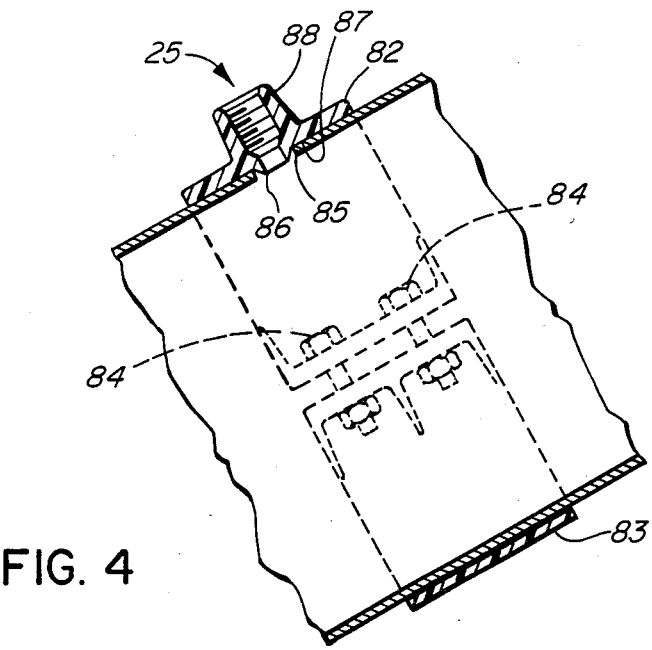
FIG. 4 is an enlarged sectional view of the inlet means.

The inlet means (FIG. 4) includes two parts, an upper half 82 and a lower half 83. The lower half 83 may be identical in structure to the bottom member 34 of the bracket 21 so as to reduce the number of different parts required to produce the applicator. The upper half 82 is similar to the lower half and when clamped to the lower half by way of fasteners 84 in the form of nuts and bolts, the inlet means may be secured to the outer casing 12 of the conveyor 11. Before the inlet means is secured to the casing a small hole 85 is drilled through the casing. The upper half 82 of the inlet means has a small nozzle 86 projecting inward from inner cylindrical surface 87 of the upper half and which fits into the hole 85. A nipple 88 projects upwardly from the outer side of the upper half 82 and communicates with the nozzle so that the conduit 26, which is preferably a short piece of flexible hose can be connected to the nipple 88 to permit flow of the additive from the valve 62 to the nozzle 86. A separate element may be provided to form the nozzle 86 and nipple 88, such an element being inserted into a bore in upper half 82. With this arrangement, the same member which is used for the upper half 82 can be also used for the lower half 83 of the inlet means and also for the bottom member 34 of the bracket 21.

As is indicated above, the applicator 10 is first installed by drilling the small hole 85 and then mounting the inlet means 25 with the nozzle 86 extending into the hole. The fasteners 84 are tightened to hold the inlet means in position on the conveyor casing, and then the bracket 21 is secured at a distance from the inlet means in a direction towards the higher end of the conveyor. When fasteners 36 are tightened the bracket is clamped to the conveyor with the central plane of the bracket being substantially normal to the longitudinal axis of the auger 13. The conveyor with the inlet means and bracket mounted thereon can be taken to the field where the seed grain is to be loaded into the seed drill. The container 22 can be filled before it is taken to the field and the lid installed or it can be filled before it is lowered between the arms. The container is first placed between the arms 24,24 so that the cylindrical portions 50 of the stub shafts 47 are positioned in the lower ends of the slots 78. By then pushing down on container, the cylindrical portions of the stub shafts push through the restricted portions 81 of the slots and into the aperture portions 77 of the openings 76. Because the aperture portions 77 are dimensioned to tightly secure the cylindrical portions of the stub shafts the container can be pivoted with some resistance so that it is positioned in an upright position regardless of the angle of inclination of the conveyor. The flexible hose is installed between the valve 62 and the nipple 88.

The valve is positioned to let the additive trickle from the container 22 to the interior of the casing 12 as the auger is started to transfer grain to the seed drill. By observing the rate of discharge of grain from the spout 17 of the conveyor and rate as which the additive is dropping in the container one can quickly observe whether the treatment is being applied to the seed in approximately an acceptable range. The container, which is at least semi-transparent may have a scale provided down one side so that the number of liters which have been used can be easily read. By observing the setting of the valve 62 and calculating the exact rate of application at the end of each application, valve settings can be subsequently used which will give very accurate application of the additive.

When the treatment is complete, the container 22 can be removed from the bracket by pulling up on the container. After removing the lid 65 the unused additive can be returned to its storage container. The container 22, valve 65 and the flexible hose may then have the toxic additive flushed therefrom.

The applicator 10 may be used for applying other liquid additives to particulate material. For example, liquid feed supplement may be mixed into feed grain or chop as it is being augered to a storage bin or into a feed trough.

Figure 7:
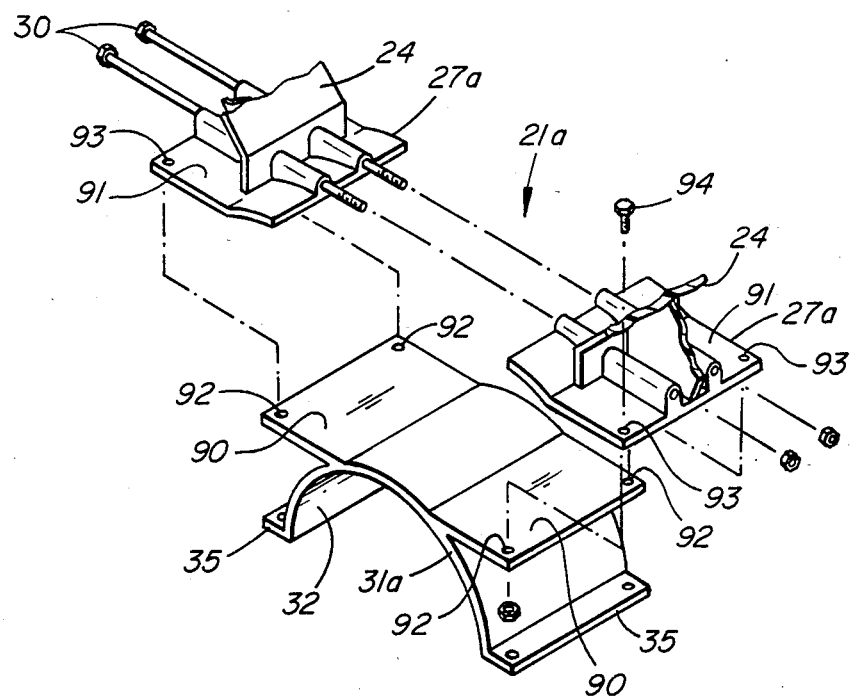
FIG. 7 is an exploded perspective view of a lower portion of a modified form of the bracket.

Referring now to the embodiment of the bracket 21a which is shown in FIG. 7, a pair of like parts 27a,27a include arms 24,24 which are of the same configuration shown in the above embodiment and are only partially shown in FIG. 7. Unlike the above embodiment, the entire base portion is not formed integrally with the arms. Instead a base portion 31a is formed as a separate part for providing the downwardly open semi-cylindrical inner surface 32. Formed near the top of the base portion 31a is a pair of horizontal wings or flanges 90,90. Like parts 27,27, the parts 27a,27a are bolted together by fastener 30 so that the diverging arms 24,24 in effect become a single piece. In the embodiment of FIG. 7, however, each of the parts 27a,27a have a horizontal flange 91 formed at the bottom thereof. The flanges 90,90 and 91,91 have openings 92 and 93, respectively near the outer corners thereof, and when parts 27a,27a are bolted together the openings 92 and 93 align so that the flanges 91,91 can be bolted by fasteners 94 on top of the flanges 90,90.

The embodiment of the bracket shown in FIG. 7 has a number of advantages. It is necessary to make only one size of a piece for providing parts 27a,27a which are bolted together to form the arms. The part forming base portion 31a, like the part forming bottom member 34 can be made in a number of sizes to fit conveyors of different diameters. Regardless of the size of the base portion 31, the shape of the flanges 90,90 and the location of the openings 92 remain the same so that the same arm forming portion made up of parts 27a,27a can be bolted thereon. In some instances it may be desirable not to clamp the bracket to the conveyor. Thus the flat bottom surface provided by flanges 91,91 can be bolted against the horizontal bed of a truck or even the vertical side walls of a truck body. The container 22 is then mounted between the arms 24,24 in the same manner as if the bracket 21 is mounted on the conveyor. With this type of installation, the inlet means is mounted on the conveyor in the same manner as before, and the conduit means 26 extends from the container at its mounting more remote from the conveyor to the inlet means mounted on the conveyor. Also, it is convenient to remove the arm portion from the parts which normally clamp it to the conveyor when the conveyor is used other than with the applicator. This would leave the inlet means 25 and the parts 31a and 34 clamped to the conveyor, but the arm portion of the bracket, which is more vulnerable to breakage and also makes the conveyor more awkward to handle, can be stored with the container and tubing until it becomes desirable to again use the conveyor to apply the seed treatment additive.

Obvious modifications can be made to the illustrated embodiment, which has been shown as an example, without departing from the spirit of the invention as defined in the accompanying claims.

What I claim is:

1. A device mountable directly on an outer casing of a screw type auger for introducing a liquid additive to a particulate material being conveyed through said auger, said device comprising:

a container for holding a supply of the additive and having an outlet means;

a bracket member having a clamp means for rigid attachment to said casing of said auger;

said bracket member including a pair of upwardly projecting arms having outer extremities sufficiently spaced to receive said container therebetween;

pivoting connection means provided on said outer extremities and on said container for mounting said container on said bracket member and for permitting adjustment of said container to an upright position;

an additive inlet member including means for providing connection thereof to said casing and means for communication with the interior of said casing; and flexible conduit means for connecting said outlet means of said container to said inlet member for permitting flow of the additive from the container to the interior of said auger.

2. A device as defined in claim 1, wherein said bracket member includes a base portion having means for at least partially encompassing said casing of said conveyor, said pair of arms projecting upwardly from said base portion.

3. A device as defined in claim 2, wherein said means for at least partially encompassing said casing and said pair of arms are separately formed, and further including means for detachably securing said arms to the encompassing means.

4. A device as defined in claim 3, wherein said encompassing means includes a top member defining a downwardly open semi-circular surface, a bottom member defining an upwardly open semi-circular surface, said semi-circular surfaces together defining a surface to closely encompassing the casing of said conveyor, and means for securing said top and bottom members together, said top member having means defining a substantially flat surface thereabove, said arms having a base portion defining a flange with a substantially flat bottom surface, and means for detachably securing the flange of the base portion of said arms on the flat surface of said encompassing means.

5. A device as defined in claim 1, wherein said clamp means forms a base portion of said bracket member, said bracket member having a central plane normal to the longitudinal axis of the auger when mounted thereon.

6. A device as defined in claim 5, wherein said pivoting connection means on said container includes means formed on diametrically opposite sides of said container for interconnection with the means on said arms.

7. A device as defined in claim 6, wherein said container is defined by a wall about a vertical central axis and a horizontal pivot axis intersecting said central axis, said pivot axis extending through said pivot means.

8. A device as defined in claim 7, wherein said means forming the interconnection between each side of the container and one of the arms comprises a projection formed on one of the wall and arm, and a web formed on the other of the wall and arm, said projection having a cylindrical portion on a horizontal axis, said web being in a vertical plane and having an aperture for pivotally receiving said cylindrical portion therein.

9. A device as defined in claim 8, wherein said projection has an enlarged head for preventing endwise removal of said cylindrical portion from said aperture; and said web has a slot extending from a side edge thereof to said aperture, said slot being dimensioned to permit resistive sideways passage of said cylindrical portion of said projection into said aperture.

10. A device mountable directly on an outer casing of a screw type auger for introducing a liquid additive to a particulate material being conveyed through said auger, said device comprising:
a container for holding a supply of the additive and having an outlet means;
a bracket for rigid attachment to said casing and including a base portion having means for at least partially encompassing said casing of said conveyor; said bracket including a pair of arms stretching upwardly from said base portion, said arms having outer extremities sufficiently spaced to receive said container therebetween;
pivoting connection means for mounting said container on said bracket and for permitting adjustment of said container to an upright position;
said pivotal connecting means including means formed on said side walls of said container for interconnection with said means carried on said outer extremities of said arms;
an additive inlet means including means for providing connection thereof to said casing and means for communication with the interior of said casing; and
conduit means for connecting said outlet means of said container to said inlet means for permitting flow of said additive means from the container to the interior of said auger.

11. A device as defined in claim 1 or 10, wherein said pivotal connecting means includes means for permitting manual removal of said container from between said arms.

12. A device for introducing a treatment liquid into a conveyor for mixing with seed grain being transferred through the conveyor, the conveyor being of the type having a rotatable auger mounted in an outer cylindrical casing, said device comprising:
a mounting bracket having a base portion for clamping the bracket to said casing of the conveyor;
said bracket including a pair of arms formed integrally with and projecting away from said base portion;
said arms having intermediate portions diverging from each other and outer substantially parallel portions;
mounting means on inner surfaces of said outer portions;
a container for said treatment liquid having a bottom outlet means;
said container having a side wall defining an open top and being circular in horizontal cross-section;
said container having mounting means at diametrically opposed locations on the exterior of said side wall below said open top, said mounting means on said container interconnecting with said mounting means on said arms for holding said container between said arms and permitting pivoting of said container to an upright position; and
inlet means for clamping to the casing of the conveyor and connected by a liquid flow passage to said outlet means of said container for permitting flow of the treatment liquid from said container to the interior of said casing.

13. A device as defined in claim 12, wherein said mounting means on the inner surface of said arms includes a pair of opposed inwardly projecting stub shafts on a common horizontal axis, and wherein the mounting means on the side wall of said container include means defining a pair of apertures, the aperture receiving said stub shafts when said container is mounted between said arms.

14. A device as defined in claim 13, wherein said container is formed of plastic material and said aperture defining means includes a pair of webs on opposite exterior sides of said container, said webs being integrally formed with plastic container wall and lying in substantially parallel vertical planes.

15. A device as defined in claim 14 wherein each web is spaced outwardly from said side wall and is joined to said side wall by a pair of spaced flanges formed integrally between said side wall and along side edges of said web.

16. A device as defined in claim 15, wherein each stub shaft has an enlarged head spaced from said inner surface of said arm, the length of the stub shaft between said inner surface and said enlarged head being slightly greater than the thickness of said web.

17. A device as defined in claim 16 wherein said web has a slot thereon extending from a lower edge of said web to said aperture, said slot having a lower end portion of greater width than the diameter of said stub shaft and an intermediate portion between said lower end portion and said aperture, said intermediate portion being narrower than the diameter of said stub shaft whereby sideway passage of the stub shaft through said slot when said container is being mounted or removed from the bracket requires inner distortion of said web.

18. A device as defined in claim 12, 13 or 14, wherein the side wall about said open top is externally threaded, and said container further includes a lid closure member including a circular central portion and a pheripheral skirt having internal threads for mating engagement with the threads of said side wall.

19. A device as defined in claim 12, wherein said side wall of said container is formed by a plurality of tiered sections, each section tapering downwardly and inwardly, the taper of each section being greater than the taper of the section immediately thereabove.

* * * * *